United States Patent [19]

McDermott

[11] 4,132,090
[45] Jan. 2, 1979

[54] CROWNED INVOLUTE SPLINES AND METHOD OF MAKING

[75] Inventor: Hugh L. McDermott, Edina, Minn.

[73] Assignee: Eaton Corporation, Cleveland, Ohio

[21] Appl. No.: 792,170

[22] Filed: Apr. 29, 1977

[51] Int. Cl.² .......................... F16D 3/18; B23F 5/22; B23F 9/08
[52] U.S. Cl. .......................................... 64/9 R; 90/4
[58] Field of Search ............................ 90/4, 6; 64/9 R

[56] References Cited

U.S. PATENT DOCUMENTS

| | | | |
|---|---|---|---|
| 2,731,886 | 1/1956 | Saari | 90/4 |
| 2,744,449 | 5/1956 | Belden et al. | 90/4 |
| 2,927,510 | 3/1960 | Wildhaber | 90/4 |

*Primary Examiner*—Leonidas Vlachos
*Attorney, Agent, or Firm*—Leslie J. Kasper

[57] ABSTRACT

An improved drive shaft is disclosed of the type used in a rotary fluid pressure device including an input-output shaft and a gerotor gear set having an externally toothed member which orbits and rotates within an internally toothed member. Both the input-output shaft and the externally toothed member define straight internal splines, and the drive shaft includes a set of crowned, involute external splines at each end thereof, in engagement with the respective straight internal splines. The crowned external splines are hobbed with a hob on which the cutter teeth have a pressure angle $\phi_H$ greater than the primary pressure angle $\phi_S$ of the crowned splines. The increased pressure angle $\phi_H$ of the cutter teeth makes it possible to reduce the crown angle on the splines, while still maintaining the necessary clearance X between each external spline and the adjacent internal spline at any given axial distance Y along the external spline from the central plane. Reducing the crown angle makes it possible either to increase the length of the external splines for a given shank diameter, or to increase the shank diameter for a given spline length. In either case, the result is an increase in the torque carrying capacity of the shaft by a factor F, wherein F equals the ratio of sin $\phi_H$/sin $\phi_S$.

12 Claims, 7 Drawing Figures

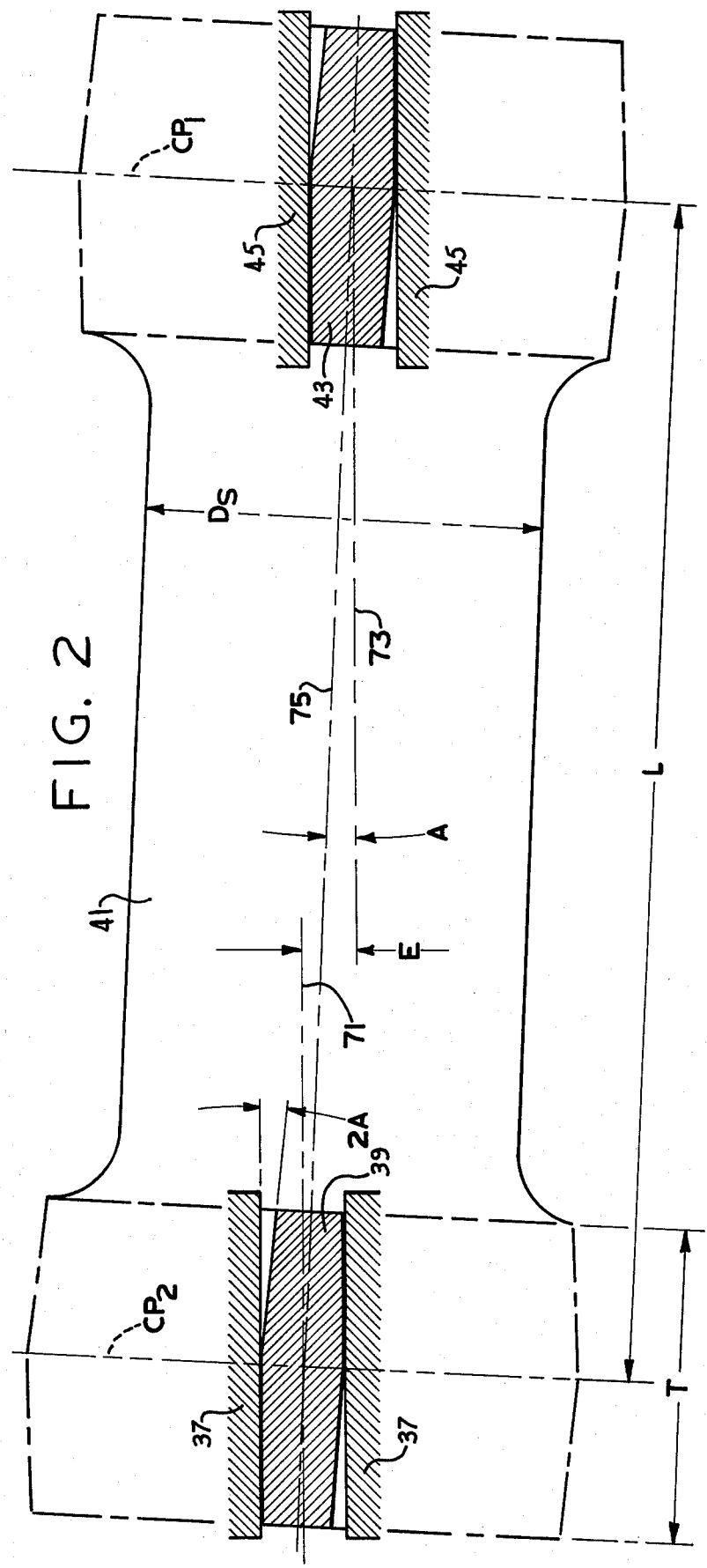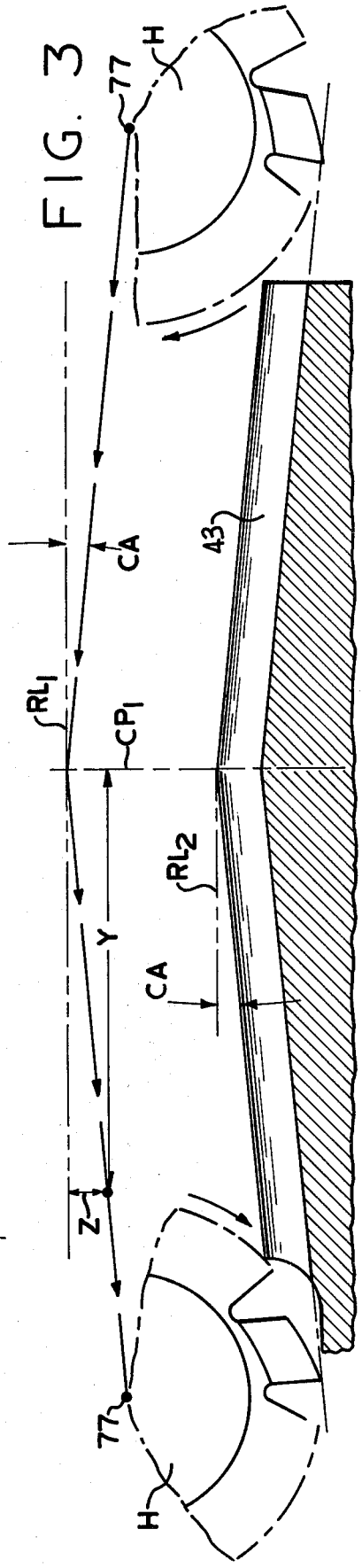

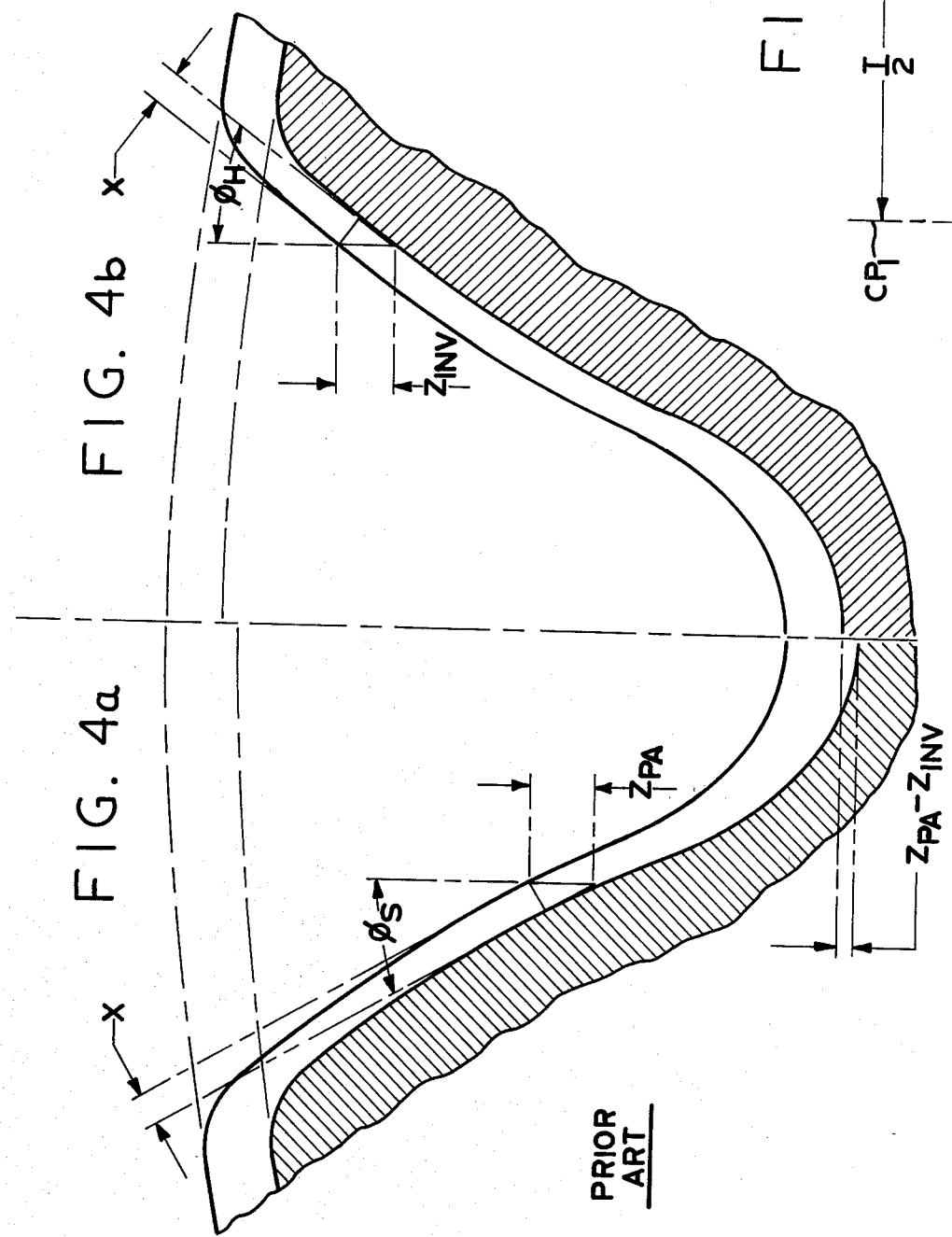
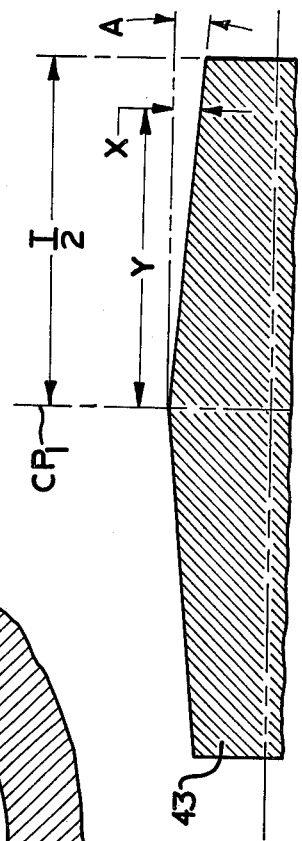
FIG. 4a  FIG. 4b  FIG. 5
PRIOR ART

CROWNED INVOLUTE SPLINES AND METHOD OF MAKING

BACKGROUND OF THE DISCLOSURE

The present invention relates to spline connections, and more particularly, to spline connections in which one of the sets of splines comprises crowned, involute external splines.

It should become apparent from the subsequent detailed description that the present invention is applicable wherever a shaft is provided with a set of crowned, involute external splines which transmit torque to or from a set of straight, involute internal splines, wherein the internal and external splines cooperate to act as a form of universal connection, wherein the axis of the shaft having the external splines is not parallel to the axis of the element associated with the set of internal splines. Therefore, it should be understood that the present invention may be applied to a single set of crowned, external splines on a shaft having a different form of universal connection at its other end, as well as to a drive shaft having sets of crowned, external splines at both ends.

The invention is especially advantageous when used in a drive connection for transmitting torque between a member having pure rotational motion and a member having both orbital and rotational motion. Such a drive arrangement is commonly found in rotary fluid pressure devices (either a motor or pump) which include a gerotor gear set, and the present invention will be described in connection therewith.

Fluid motors of the type utilizing a gerotor gear set to convert fluid pressure into a rotary output have become popular and are especially suited for low speed, high torque applications. In most of the commercially available fluid motors of this type, one of the primary factors limiting the torque output capability of the motor is the strength of the drive connection which transmits torque from the orbiting and rotating member (rotor) of the gerotor gear set to the output shaft of the motor. Typically, this drive connection comprises a set of internal splines defined by the rotor, a set of internal splines defined by an enlarged portion of the output shaft and a main drive shaft having a set of external splines at each end thereof in engagement with the sets of internal splines. Generally, the internal splines are straight whereas the external splines are crowned to take into account the angle at which the drive shaft is oriented relative to the axis of rotation of the motor.

Crowned splines are usually manufactured by a process referred to as "rise-and-fall" hobbing, especially when a large volume of production is involved. As is well known in the art, when a set of crowned external splines is produced by rise-and-fall hobbing, the individual splines are normally symmetrical about a central plane oriented perpendicular to the axis of the drive shaft, the plane intersecting each of the splines at the theoretical "peak" of the crown. For purposes of simplicity in describing the present invention, it will be assumed that the 'crown angle' and the 'rise and fall' angle are equal, and may be used interchangeably. As is also well known in the art, the crown angle of the external splines should be sufficient that at any axial distance from the central plane along the external spline, there will be a clearance between the external spline and the adjacent internal spline (measured perpendicular to the flank of the external spline with the axis of the shaft parallel to the axis of the internal splines) to prevent interference between adjacent splines during operation of the device.

Among the factors which determine the torque carrying capacity of this type of drive connection are the spline length (i.e., the axial length of the individual external splines), and the shank diameter (i.e., the diameter of the shaft between the sets of external splines). As has been recognized by those skilled in the art, an attempt to increase the torque carrying capacity of a drive shaft by increasing either tooth length or shank diameter is limited by the interdependence of the two factors. On external splines cut by rise-and-fall hobbing, as the tooth length is increased, the depth of cut toward the ends of the spline set increases. Thus, the shank diameter would actually have to be decreased; otherwise, the hob cutter would cut into the shank adjacent the end of the spline, weakening the shank. Conversely, if the shank diameter is increased, it would be necessary to decrease the spline length to reduce the depth of cut at the ends of the spline, again to prevent the hob cutter from cutting into the shank.

Although the background of the invention has been discussed in terms of torque carrying capacity, it is also related to spline life. As a rough guideline, it is generally recognized that spline life is approximately proportional to spline length for a given torque, or that torque is approximately proportional to spline length for a given spline life.

SUMMARY OF THE INVENTION

Accordingly, it is an object of the present invention to provide an improved drive connection of the type described in which it is possible to effect an increase in the torque transmitting capacity of the connection, or the life of the connection, or a combination of the two.

It is a more specific object of the present invention to provide an improved drive shaft and method of making same in which it is possible to increase either the spline length or the shank diameter without a proportional decrease in the other, thus achieving an overall increase in the capacity of the drive shaft.

It is an even more specific object of the present invention to provide a method of hobbing a set of crowned external involute splines on a shaft of the type described above wherein, at any given axial distance along the spline from the central plane, the depth of cut is decreased without decreasing the clearance between the external spline and the adjacent internal spline.

It is a related object of the present invention to achieve the above-stated objects without causing the crowned external splines to deviate substantially from true involute form.

The above and other objects of the present invention are accomplished by the provision of an improved drive shaft and a novel method of making such a shaft. The drive shaft has first and second sets of axially-disposed external crowned splines for transmitting torque between first and second sets of internal straight splines. The sets of internal straight splines define an eccentricity E, and each of the sets of external crowned splines defines a central plane oriented generally perpendicular to the axis of the shaft. The shaft defines an axial length L between the first and second central planes and a running angle $A = \arcsin E/L$. Each of the external splines has a primary pressure angle $\phi_S$ and is crowned an amount sufficient to provide a clearance X between the external spline and the adjacent internal spline at any given axial distance Y along the external spline from the central plane. The clearance X and the axial distance Y are related by the equation X = Y tan A. The method comprises providing a hob cutter having cutter teeth with a pressure angle $\phi_H$ wherein $\phi_H$ is greater than $\phi_S$. The hob cutter is rotated to affect hobbing of the splines, and simultaneously, the hob cutter is fed along the length of the external splines such that the axis of the hob cutter follows a path defined by a variable dimension Z. The dimension Z is the radially inward movement (i.e., depth of cut) of the hob cutter from a reference line toward the axis of the drive shaft and conforms to the following equation:

$$Z = Y \tan A / \sin \phi_H$$

BRIEF DESCRIPTION OF THE DRAWINGS

FIG. 2 is a somewhat schematic illustration, on a greatly enlarged scale, of the splined drive connection used in the fluid motor of FIG. 1.

FIG. 3 is a diagrammatic illustration of the process of hobbing a set of crowned external splines in accordance with the present invention.

FIG. 4a is a fragmentary transverse cross section through a crowned spline made in accordance with the prior art.

FIG. 4b is a fragmentary transverse cross section through a crowned spline made in accordance with the present invention.

FIG. 5 is a fragmentary cross section through a crowned spline, on a scale larger than that of FIG. 2 but smaller than that of FIG. 3, and taken on a plane perpendicular to the spline flank.

DESCRIPTION OF THE PREFERRED EMBODIMENT

Figure 1:
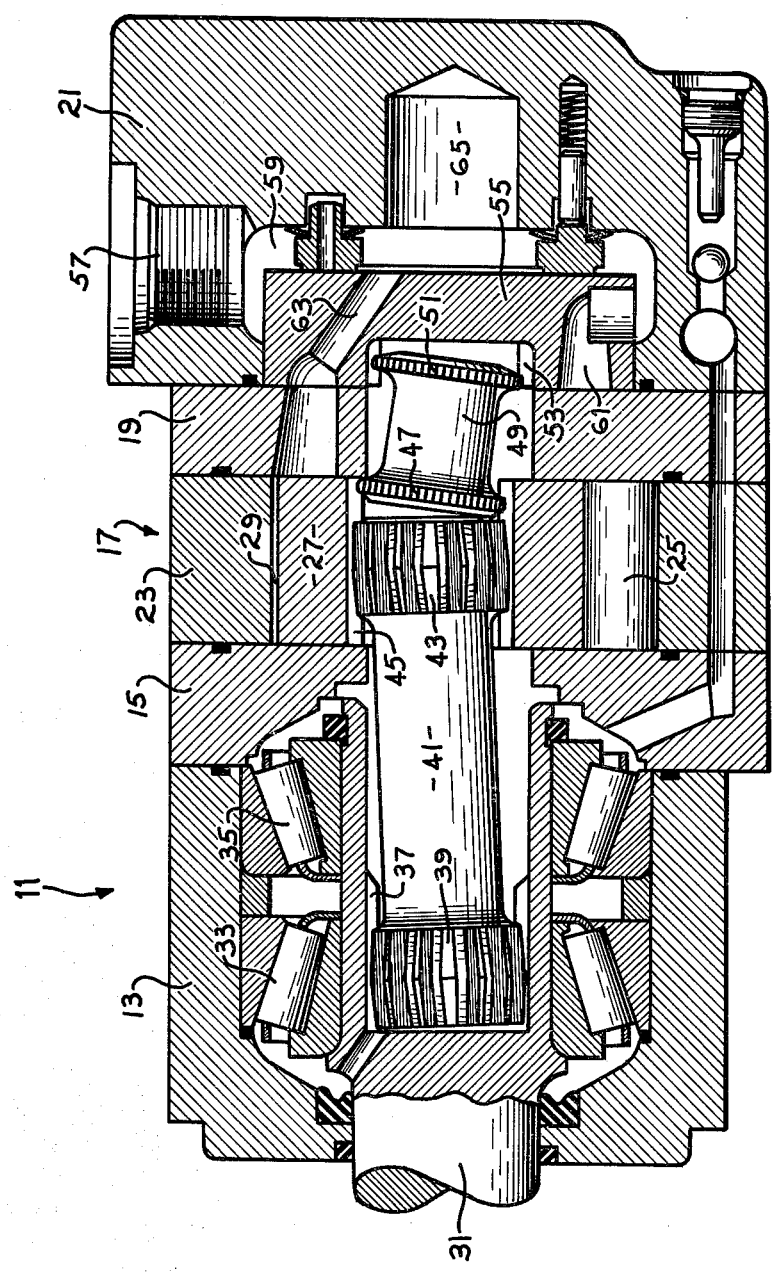
FIG. 1 is an axial cross section of a fluid motor of the type to which the present invention relates.

Referring now to the drawings, which are not intended to limit the invention, FIG. 1 is an axial cross section of a fluid motor of the type to which the present invention may be applied and which is illustrated and described in greater detail in U.S. Pat. Nos. 3,572,983; 3,862,814; and others, assigned to the assignee of the present invention. More specifically, FIG. 1 shows a hydraulic motor of the "orbiting" type, it being understood that the term "motor" when applied to such fluid pressure devices is also intended to encompass the use of such devices as "pumps".

The hydraulic motor, generally designated 11, comprises a plurality of sections secured together, as by a plurality of bolts (not shown) and including a shaft support casing 13, a wearplate 15, a gerotor gear set 17, a port plate 19, and a valve housing 21.

The gerotor gear set 17 is well known in the art and will be described only briefly herein. The gerotor gear set 17 comprises an internally-toothed member 23 including a plurality of internal teeth, comprising, in the subject embodiment, a plurality of cylindrical members 25 rotatably disposed in generally semi-cylindrical recesses formed in the member 23 as is now well known in the art. Eccentrically disposed within the internally toothed member 23 is an externally toothed member 27, typically having one less external tooth than the number of cylindrical teeth 25, thus permitting the externally toothed member 27 to orbit and rotate relative to the internally toothed member 23, the relative orbital and rotational movement therebetween defining a plurality of expanding and contracting volume chambers 29.

Referring still to FIG. 1, the motor 11 includes an input-output shaft 31 positioned within shaft support casing 13 and rotatably supported therein by suitable bearing sets 33 and 35. Shaft 31 includes a set of internal, straight involute splines 37, and in engagement therewith is a set of external, crowned involute splines 39 formed on one end of a main drive shaft 41. Disposed at the opposite end of the main drive shaft 41 is another set of external, crowned involute splines 43, in engagement with a set of internal, straight involute splines 45 formed on the inside diameter of the externally toothed member 27. Therefore, in the subject embodiment, because the internally toothed member 23 includes seven internal, cylindrical teeth 25, seven orbits of the externally toothed member 27 result in one complete rotation thereof and as a result, one complete rotation of the main drive shaft 41 and the input-output shaft 31.

Also in engagement with the internal splines 45 is a set of splines 47 formed about one end of a valve drive shaft 49, which has, at its opposite end, another set of external splines 51 in engagement with a set of internal splines 53 formed about the inner periphery of a valve member 55. The valve member 55 is rotatably disposed within the valve housing 21 and the valve drive shaft 49 is splined to both the externally toothed member 27 and valve member 55 to maintain proper valve timing therebetween as is well known in the art.

The valve housing 21 includes a fluid port 57 communicating with an annular chamber 59 surrounding the annular valve member 55. Fluid from the annular chamber 59 is communicated either to or from the gerotor gear set 17 through a plurality of valve passages 61. Valve member 55 also defines a plurality of valve passages 63 such that, if high pressure fluid from port 57 is communicated through valve passages 61 to the expanding volume chambers of the gerotor gear set 17, low pressure exhaust fluid from the contracting volume chambers is communicated through valve passages 63 to a fluid chamber 65 which communicates with a second fluid port (not shown). As is well known in the art, the direction of operation of the motor 11 may be reversed by introducing high pressure fluid into the second fluid port (not shown) communicating with the fluid chamber 65 and valve passages 63. Low pressure exhaust fluid then passes from the contracting volume chambers, through valve passages 61 to the annular chamber 59, and out port 57.

Referring now to FIG. 2, there is shown a somewhat schematic illustration of the drive connection used in the fluid motor 11 of FIG. 1 to transmit torque from the externally toothed member 27 to the output shaft 31. As used herein, the term "drive connection" is generally intended to mean and include the main drive shaft 41, both sets of external, crowned involute splines 39 and 43, and the respective, engaging sets of internal, straight involute splines 37 and 45. The set of internal splines 37 (and the output shaft 31) define an axis 71, while the set of internal splines 45 (and the externally toothed member 27) define an axis 73. The axes 71 and 73 are substantially parallel, but transversely spaced apart by a distance which is the eccentricity E of the drive connection (and of the fluid motor 11). The set of external crowned splines 43 defines a central plane $CP_1$ passing through the "peak" of each of the splines, and similarly, the set of external crowned splines 39 defines a central plane CP$_2$ passing through the "peak" of each of the splines in that set. The distance between the central planes CP$_1$ and CP$_2$ is considered to be the axial length L of the drive connection, the significance of which will be described in greater detail subsequently.

Referring still to FIG. 2, the main drive shaft 41 includes a shank portion (having a shank diameter D$_S$) disposed between the sets of external splines 39 and 43. The drive shaft 41 defines a shaft axis 75 which cooperates with the axis 73 of internal splines 45 to define an angle A which is frequently referred to as the "running angle". It should be apparent that the shaft axis 75 also cooperates with axis 71 of the internal splines 37 to define the same running angle A because the axes 71 and 73 are parallel to each other. From FIG. 2, and the above description, it may be seen that:

$$A = \arcsin E/L \quad (1)$$

It should be understood that although the present invention is being described in connection with a drive shaft having a set of external, crowned splines at each end, the invention is also applicable to a drive shaft having a set of crowned splines at one end and another form of universal connection at the opposite end. In that case, the eccentricity E of the drive connection is determined in the same manner, and the axial length L is measured from the central plane of the set of crowned splines to the geometric pivot point of the universal connection. However, it should also be appreciated that because the combination of straight internal splines and crowned external splines is a type of universal connection, the use herein, and in the appended claims, of the term "universal connection" is intended to include within its scope the combination of straight internal splines and crowned external splines.

Typically, a drive shaft such as the main drive shaft 41 having a set of external, crowned involute splines at each end is manufactured from bar stock. The bar stock is first cut to approximate length, then the shank diameter D$_S$ and the ends are machined. Next, the sets of crowned splines are hobbed, either by top-hobbing or semi-top-hobbing. It should be understood that this description is by way of background and not limitation on the scope of the invention.

Referring now to FIG. 5, in conjunction with FIG. 2, each of the crowned splines 39 and crowned splines 43 has an axial tooth length T and, assuming that all of the external crowned splines 39 and 43 are symmetrical about central planes CP$_2$ and CP$_1$, respectively, the distance from the central plane to the end of each of the splines is T/2. In connection with FIG. 5, it should be noted that in order to facilitate mathematical analysis of the invention, the external spline 43 is assumed to be oriented with its axis parallel to the axis of the adjacent internal splines 45, rather than having its axis disposed at the running angle A relative to the axis of the splines 45, as in FIG. 2. Accordingly, in FIG. 5, the angle defined by the spline flank (surface) and the adjacent internal spline 45 is equal to the running angle A. Referring still to FIG. 5, which is a section taken on a plane perpendicular to the spline flank, it may be seen that at any axial distance Y from the central plane along the length of the spline, there must be at least a minimum clearance X between the external spline and the adjacent internal spline. The axial distance Y and the spline clearance X are related to each other, and to the running angle A by the following equation:

$$X = Y \tan A \quad (2)$$

As was mentioned in the background of the present specification, the clearance X is necessary to prevent interference between each of the external crowned splines and the adjacent internal spline as the drive connection operates at the running angle A as shown in FIG. 2. As may best be seen in FIG. 2, if the clearance X is maintained very accurately in conformity with equation (2) above, one-half of each spline flank will be oriented substantially parallel to the spline flank of the adjacent internal spline. When this occurs, the other half of the external spline flank cooperates with the flank of the adjacent internal spline to define an included angle 2A (i.e., twice the running angle A).

Referring now to FIG. 4a, there is shown a transverse cross section through a spline made in accordance with the teachings of the prior art, at an axial distance Y from the central plane. Similarly, FIG. 4b is a transverse cross section through a spline made in accordance with the teachings of the present invention, at the same axial distance Y as in FIG. 4a. In either case, the same clearance X is maintained, but as will be described in greater detail subsequently, the depth of cut Z (or radially inward movement of the hob cutter toward the axis of the shaft 41) is reduced. This dimension Z is illustrated diagrammatically in FIG. 3 in which the position of a rotating hob cutter H is shown in two positions: just before it begins to cut the external crowned splines 43, and again, just after it has finished cutting the splines 43. It may be seen in FIG. 3 that an axis of rotation 77 of the hob cutter H defines a path which cooperates with a first reference line RL$_1$ to define a crown angle CA. The crown angle CA is represented in FIG. 3 as the included angle between the reference line RL$_1$ and the path defined by axis of rotation 77. It is also represented by the included angle between a second reference line RL$_2$ (which is parallel to reference RL$_1$) and the spline tip. It will be understood that the latter relationship is strictly true only in the case of a spline which is top-hobbed, and for a spline which is not top-hobbed, the crown angle is determined instead by the included angle between the root of the spline and another reference line parallel to reference line RL$_2$. The crown angle CA may also be expressed in terms of the axial distance Y from the central plane CP$_1$ and the depth of cut Z (the radially inward movement of the axis of rotation 77 relative to the reference line RL$_1$) by the following equation:

$$CA = \arctan Z/Y \quad (3)$$

Referring again to FIG. 4a, it has been common practice in the prior art to hob a set of external crowned splines which are intended to have a primary pressure angle $\phi_S$ by using a hob cutter on which the cutter teeth also have a pressure angle $\phi_S$. The result is that at any axial distance Y, in order to achieve the required clearance X, it is necessary to use a crown angle which results in the appropriate depth of cut Z$_{PA}$ (depth of cut, prior art) as determined by the following equation:

$$Z_{PA} = X/\sin \phi_S \quad (4)$$

Referring now to FIG. 4b, it is an essential feature of the present invention to hob a set of external crowned splines having a primary pressure angle $\phi_S$ using a hob cutter on which the cutter teeth have a pressure angle $\phi_H$, wherein $\phi_H$ is greater than $\phi_S$. It is believed that the extent of the difference between $\phi_S$ and $\phi_H$ needed to accomplish the objectives of the invention will become apparent from the subsequent description. The result will be that, at any axial distance Y, in order to achieve the required clearance X, it is necessary to use a crown angle CA which results in the appropriate depth of cut $Z_{INV}$ (depth of cut, invention) as determined by the following equation:

$$Z_{INV} = X/\phi_H \quad (5)$$

By comparing equations (4) and (5), as well as FIGS. 4a and 4b, it may be seen that increasing the pressure angle of the hob cutter from $\phi_S$ to $\phi_H$ increases the value of the sin, and for a given clearance X, makes the depth of cut $Z_{INV}$ less than the prior art depth of cut $Z_{PA}$.

Referring again to FIG. 3 in conjunction with FIG. 4b, and in view of the background discussion in the present specification, it should now be apparent that the use of the improved rise-and-fall hobbing method disclosed herein makes it possible to increase the spline length T for a given shank diameter $D_S$ or conversely, increase the shank diameter $D_S$ for a given spline length T.

To illustrate further the beneficial affects which may be achieved by the use of the present invention, the following example will be considered.

EXAMPLE

In one embodiment adapted for commercial use, the main drive shaft 41 had the following dimensions:

$$L = 2.000 \text{ in.}$$

$$E = 0.100 \text{ in.}$$

$$T = 0.500 \text{ in.}$$

For purposes of convenience, the necessary calculations are made with reference to a plane at approximately the end of the spline at which $Y = T/2 = 0.250$ in. Using equation (1) the running angle A is determined:

$$A = \arcsin E/L \quad (1)$$

$$A = \arcsin 0.100/2.000$$

$$A = 2.866 \text{ degrees}$$

Applying equation (2), the required clearance X is calculated:

$$X = Y \tan A \quad (2)$$

$$X = (0.250 \text{ in.}) \tan 2.866$$

$$X = 0.0125 \text{ in.}$$

In this example, the crowned splines had a primary pressure angle $\phi_S$ of 30 degrees. Therefore, the depth of cut at the ends of the spline, in accordance with the prior art, is found to be:

$$Z_{PA} = X/\sin \phi_s \quad (4)$$

$$Z_{PA} = 0.0125 \text{ in.}/\sin 30 \text{ degrees}$$

$$Z_{PA} = 0.0250 \text{ in.}$$

In applying the teachings of the invention, a hob cutter was selected having a cutter tooth pressure angle $\phi_H$ of 37 degrees, resulting in a depth of cut $Z_{INV}$ as follows:

$$Z_{INV} = X/\sin \phi_H \quad (5)$$

$$Z_{INV} = 0.0125 \text{ in.}/\sin 37 \text{ degrees}$$

$$Z_{INV} = 0.0208 \text{ in.}$$

It would have been possible in this example to increase the shank diameter $D_S$ by an amount equal to twice the decrease in the depth of cut Z as follows:

$$\text{increase in } D_S = 2 (Z_{PA} - Z_{INV}) \quad (6)$$

$$\text{increase in } D_S = 2 (0.0250 - 0.0208)$$

$$\text{increase in } D_S = 0.0084 \text{ in.}$$

Alternatively, it would have been possible, using the present invention, to increase the spline length T. This increase can be determined by starting with the depth of cut $Z_{PA} = 0.0250$ and calculating a new axial distance $Y_{INV}$ to the end of the spline by the following equation which is a combination of equations (2), (4), and (5):

$$Z_{PA} = \frac{Y_{INV} \tan A}{\sin \phi_H} \quad (7)$$

$$\frac{\sin \phi_H}{\tan A} \cdot Z_{PA} = Y_{INV}$$

$$Y_{INV} = \frac{\sin 37 \text{ degrees} (.0250 \text{ in.})}{.0500}$$

$$Y_{INV} = \frac{.6018 (.0250)}{.0500}$$

$$Y_{INV} = 3.009 \text{ in. or}$$
$$T_{INV} = .6018 \text{ in.}$$

the increase in spline length (and therefore, torque carrying capacity for a given spline life) was slightly over 20 percent.

It is believed that the foregoing description, drawings, equations, and example are sufficient to enable one skilled in the art to practice the present invention and to apply the teachings of the invention in producing splines having primary pressure angles other than 30 degrees. However, by way of additional guidance, it appears that when hobbing a spline having a primary pressure angle $\phi_S$ of 30 degrees, the cutter teeth of the hob should preferably have a pressure angle $\phi_H$ between about 33 degrees and about 40 to 45° degrees. As should be apparent from the equations utilized previously, the benefit from the use of the present invention (e.g., increase in tooth length) may be expressed as a ratio factor F wherein:

$$F = \sin \phi_H / \sin \phi_S \quad (8)$$

Accordingly, applying equation (8) to the previous example indicates an increase in spline length (or torque carrying capacity) by a factor of sin 37 degrees/sin 30 degrees = 1.20. Therefore, it may be seen that within a preferred range of $\phi_H$ for any given $\phi_S$, resulting improvement in torque capacity increases as $\phi_H$ increases.

While experimenting with the hobbing method of the present invention, and comparing it to the prior art method, an additional advantage has been observed. By increasing the hob cutter pressure angle, and decreasing the depth of cut, the amount of undercut which normally occurs adjacent the root diameter toward the ends of the splines has been substantially decreased. Minimizing the undercut increases the beam strength of the individual splines and thus, the torque carrying capacity of each spline. The radius of the fillet is also increased which decreases the stress concentration.

Figure 6:
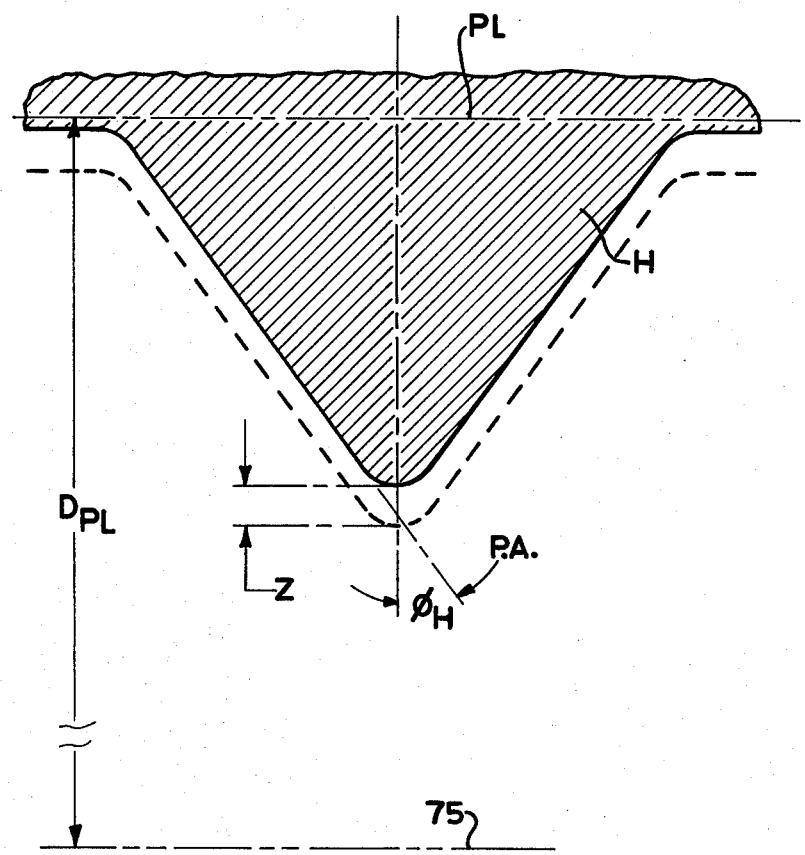
FIG. 6 is a transverse cross section through a hob cutter tooth illustrating various aspects of hob geometry which relate to the present invention.

Referring now to FIG. 6, there is shown a transverse cross section through a cutter tooth of the hob used in practicing the present invention. FIG. 6 shows a pitch line PL of the hob H. The hob H is positioned relative to the axis 75 of the main drive shaft 41 such that the pitch line PL of the hob and the axis 75 define a diameter to the pitch line $D_{PL}$ (referred to as the "pitch diameter of the hob"). As is well known to those skilled in the hobbing art, the pitch line of the hob is used as one basis for calculating hob geometry. The pitch line of the hob remains fixed, and the hob moves relative to the pitch line, as for example, when the cutter tooth moves from the position shown in solid lines to the position shown in dotted lines (i.e., when the cutter tooth moves radially inward toward the shaft axis 75 by an amount equal to the depth of cut Z). Also illustrated in FIG. 6 is the pressure angle $\phi_H$ of the hob cutter tooth.

It will also be appreciated by those skilled in the art that the use of the present invention does not substantially change the involute form of the splines produced by the method of the invention. Because the generated involute form is a function of the diameter of the base circle, which is not changed by the method of the invention, it is possible to produce a spline form identical to that produced by the prior art method, with the possible exception of a slight deviation from true involute form at the root.

It should be appreciated that, although the present invention has been described in terms of the theoretical path followed by the axis 77 of the hob H, that path is not followed precisely over the entire length of the spline. For example, in the region of the central plane, the path followed by the hob axis 77 deviates from the theoretical in order to eliminate the sharp peak shown in FIG. 3 at the central plane $CP_1$. Instead, the hob axis follows a path near the central plane which results in the external spline being somewhat rounded, rather than peaked, for smoother, quieter operation. It is believed that it would be obvious to those skilled in the art how to take into account this required deviation from the theoretical path of the hob axis when practicing the invention.

I claim:

1. A method of making an improved drive shaft of the type having first and second sets of axially-disposed external crowned splines for transmitting torque between first and second sets of internal straight splines; the sets of internal straight splines defining an eccentricity E; each of the sets of external crowned splines defining a central plane oriented generally perpendicular to the axis of said shaft; said shaft defining an axial length L between said first and second central planes and a running angle A wherein A = arcsin E/L; each of said external splines having a primary pressure angle $\phi_S$ and being crowned an amount sufficient to provide a clearance X between the external spline and the adjacent internal spline at any given axial distance Y along the external spline from the central plane, the clearance X and distance Y being related by the equation X = Y tan A, the method comprising: providing a hob cutter having cutter teeth with a pressure angle $\phi_H$, wherein $\phi_H$ is greater than $\phi_S$; rotating said hob cutter to effect hobbing of said splines; simultaneously with the preceding step feeding said hob cutter along the length of said external splines, the axis of said hob cutter following a path defined by a variable dimension Z, Z being the radially inward movement of the hob cutter axis from a reference line toward the axis of said shaft and conforming to the following equation:

$$Z = Y \tan A / \sin \phi_H.$$

2. The improved drive shaft made by the method of claim 1.

3. The method of claim 1 wherein the hob cutter pressure angle $\phi_H$ is between 3 degrees and about 15 degrees greater than the spline primary pressure angle $\phi_S$.

4. The improved drive shaft made by the method of claim 3.

5. The method of claim 1 wherein the hob cutter pressure angle $\phi_H$ is about 37 degrees and the spline primary pressure angle $\phi_S$ is about 30 degrees.

6. The improved drive shaft made by the method of claim 5.

7. A method of making a drive shaft having its torque carrying capacity increased by a factor F, the drive shaft having a set of external crowned splines and an axially-disposed universal connection for transmitting torque between a set of internal straight splines and means adapted to receive said universal connection; the set of straight splines and the receiving means defining an eccentricity E; said set of crowned splines defining a central plane oriented generally perpendicular to the axis of said shaft; said shaft defining an axial length L between said central plane and the pivot point of the universal connection and further defining a running angle A wherein A = arcsin E/L; each of said external splines having a spline length T and a primary pressure angle $\phi_S$ and having a crown angle sufficient to provide a clearance X between the external spline and the adjacent internal spline at any given axial distance Y from the central plane, the clearance X and distance Y being related by the equation X = Y tan A, the method comprising: providing a hob cutter having cutter teeth defining a pressure angle $\phi_H$, wherein $\phi_H$ is greater than $\phi_S$; rotating said hob cutter in a manner to effect hobbing of said splines; and simultaneously with the preceding step feeding said hob cutter along the portion of said shaft adapted to include said external crowned splines, the axis of said hob cutter following a path defined by the equation:

$$Z = Y \tan A / \sin \phi_H$$

for Y equal to or greater than 0 and equal to or less than T/2, wherein Z is the radially inward displacement of the hob cutter axis from a reference line on which Z = 0 when Y = 0, whereby the torque increase factor F equals $\sin \phi_H / \sin \phi_S$.

8. The drive shaft made by the method of claim 7.

9. The method of claim 7 wherein the hob cutter angle $\phi_H$ is in the range of about 3 degrees to about 15 degrees greater than the spline primary pressure angle $\phi_S$.

10. The drive shaft made by the method of claim 9.

11. The method of claim 7 wherein the hob cutter pressure angle $\phi_H$ is selected, relative to the spline primary pressure angle, such that said torque increase factor F is equal to at least about 1.20.

12. The drive shaft made by the method of claim 11.

* * * * *